United States Patent [19]
Herwig et al.

[11] 4,433,529
[45] Feb. 28, 1984

[54] TORSION SPRING COUPLED DRIVE MECHANISM FOR RECIPROCATING DEVICE HAVING HAZARD WARNING MEANS

[75] Inventors: Warren E. Herwig, Wind Lake; Tony L. Kaminski, Greendale; Paul T. Shupert, Milwaukee, all of Wis.

[73] Assignee: Allis-Chalmers Corporation, Milwaukee, Wis.

[21] Appl. No.: 430,015

[22] Filed: Sep. 30, 1982

[51] Int. Cl.³ .................. A01D 35/02; A01D 75/20
[52] U.S. Cl. ........................... 56/10.2; 56/DIG. 15; 56/306; 340/684
[58] Field of Search ........ 56/10.2, 296, 306, DIG. 15; 73/650; 267/57; 340/684, 686, 668, 665

[56] References Cited
U.S. PATENT DOCUMENTS

| 280,902 | 7/1883 | Blood | 56/306 |
|---|---|---|---|
| 2,409,876 | 10/1946 | Martin et al. | 73/650 |
| 3,473,109 | 10/1969 | Maaz et al. | 340/686 |
| 3,623,059 | 11/1971 | Rickerd | 340/684 |
| 3,626,402 | 12/1971 | Price | 56/DIG. 15 |
| 4,121,272 | 10/1978 | Wolfinger | 73/650 |
| 4,296,410 | 10/1981 | Higgs et al. | 340/686 |
| 4,342,187 | 8/1982 | Shupert | 56/306 |

Primary Examiner—Robert Peshock
Assistant Examiner—John G. Weiss
Attorney, Agent, or Firm—Kee H. Kaiser

[57] ABSTRACT

An Agricultural combine having a sickle reciprocated by a wobble drive mechanism and a torsion bar coupled to the sickle to reduce the input torque requirement of the drive mechanism, is provided with a warning system to operate an alarm when energy is still stored in the torsion bar, unknown to the operator, when the drive mechanism is shut down and which stored energy could reciprocate the sickle and represent a hazard to the operator. The hazard warning system is disabled when the drive mechanism is operating.

17 Claims, 4 Drawing Figures

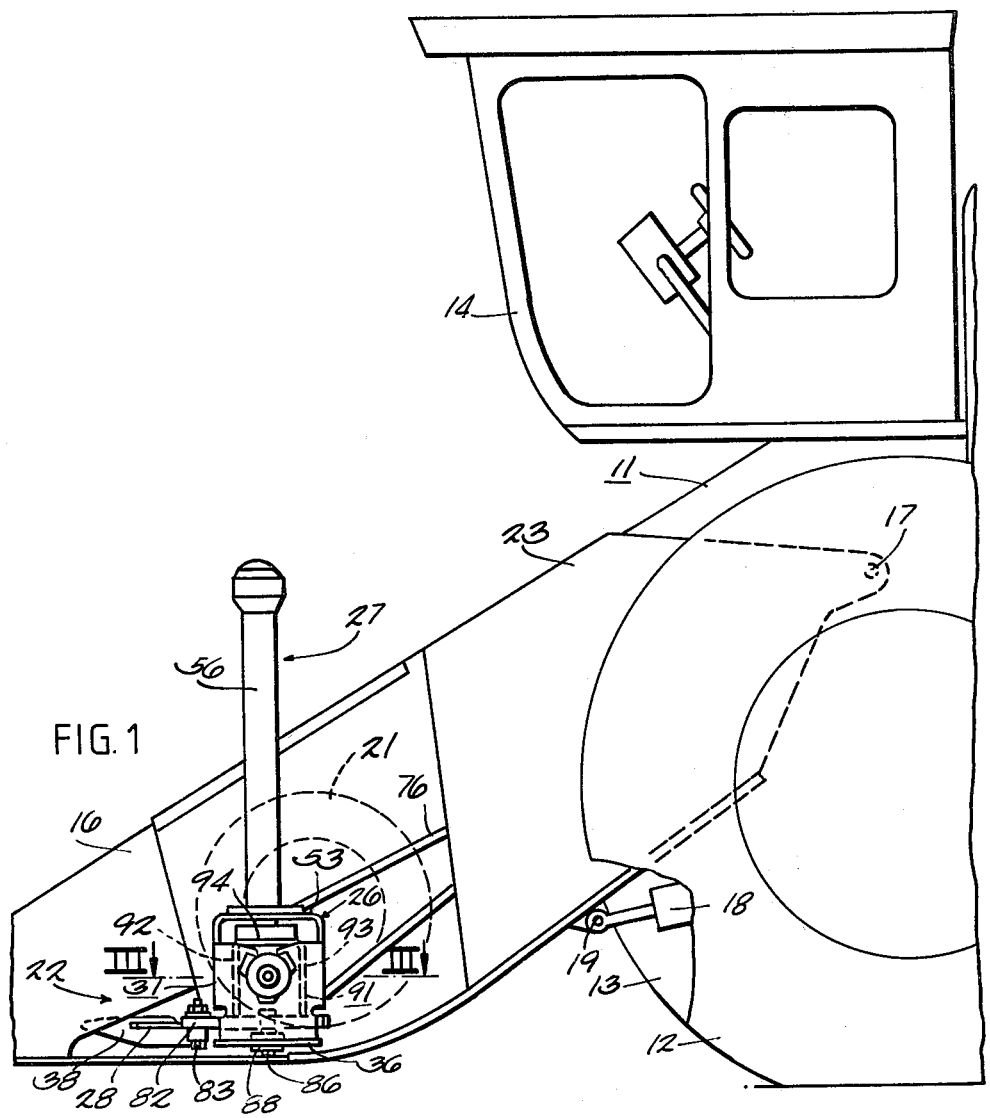
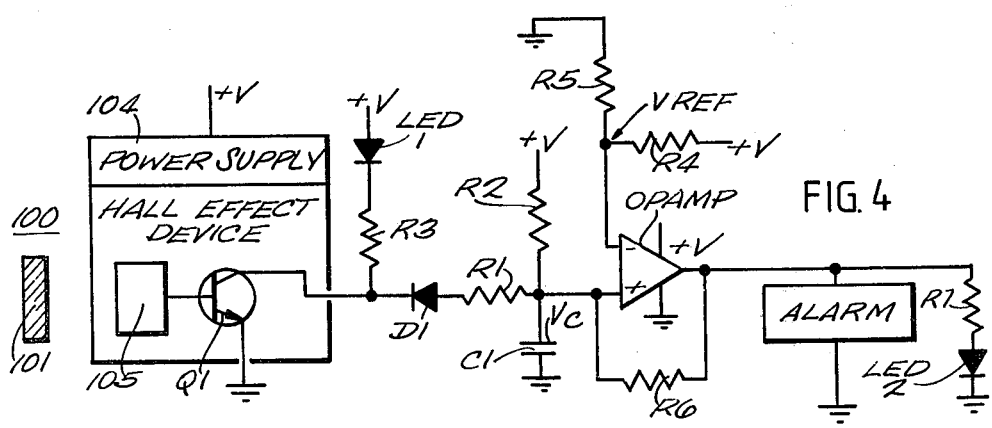

TORSION SPRING COUPLED DRIVE MECHANISM FOR RECIPROCATING DEVICE HAVING HAZARD WARNING MEANS

FIELD OF THE INVENTION

This invention relates to torsion spring coupled drive mechanisms for storing and releasing energy to a driven reciprocable device and, in particular, to such a mechanism having means to warn an operator if energy is still stored in the torsion spring when the drive is shut down which might represent a hazard to the operator.

BACKGROUND OF THE INVENTION

Wobble drive mechanisms for reciprocating the cutter bar of a mowing device are described in such U.S. Pat. Nos. as 3,397,584; 3,444,676 and 3,463,018. Also, the use of resilient spring devices for storing and releasing energy during reciprocation of a sickle bar are shown in such U.S. Pat. Nos. as 14,046; 280,901; 280,902 and 1,078,101.

The capacity of agricultural combines may be increased by operation at higher ground speed, which requires higher frequency of reciprocation of its sickle bar cutter. The inertia related forces in the cutter mechanism increase with the square of the frequency of reciprocation. U.S. Pat. Nos. 4,342,186 and 4,342,187 assigned to the same assignee as the present invention describe a torsion spring coupled, wobble drive cutting mechanism whose resonant frequency is within the reciprocating frequency range at which the sickle is normally operated for crop cutting, thereby resulting in greatly reduced input torque requirement and conserving power and energy. In one embodiment the torsion spring is in the form of an elongated torsion bar in alignment with the axis of oscillation of the sickle operating lever, and preferably the torsion bar has zero stored energy at the midpoint of reciprocation of the sickle bar and stores energy as the sickle bar moves in either direction from the midpoint to the end of its stroke so the torsion bar releases its energy to the sickle bar as the sickle bar moves from the end of its stroke to the midpoint of its stroke.

Such torsion spring coupled resonant sickle drive mechanisms create a hazard to the operator if energy is stored in the torsion spring during shutdown of the drive mechanism since fingers could possibly be cut off by unexpected sickle bar motion after the combine is shut off, or the operator possibly could be injured from unexpected motion of the wobble drive mechanism or the belt drive therefor. A rock caught between the sickle cutter bar and the guard might hold the sickle bar away from its midpoint position, thereby resulting in stored energy in the torsion bar which cannot be seen and constitutes a danger which is not obvious to the operator. Alternatively, the cutter mechanism inertia might cause the sickle bar to stop at one end of its stroke, thereby resulting in maximum energy stored in the torsion spring.

OBJECTS OF THE INVENTION

It is an object of the invention to provide a torsion spring coupled drive mechanism for a reciprocating member having safety means to warn the operator if energy is stored in the torsion spring, and thus a hazard exists, during shutdown of the drive mechanism but which is disabled during operation of the drive mechanism.

It is a further object of the invention to provide a torsion spring coupled wobble drive mechanism for a combine cutter having a safety system for monitoring the position of the cutter bar and providing a warning to the operator if the sickle bar is held in a position wherein energy is stored in the torsion spring when the combine is shut off but which safety system is disabled when the cutter is operating.

SUMMARY OF THE INVENTION

Apparatus having a reciprocating operating member such as a sickle, drive means for reciprocating the operating member, and torsion spring means coupled to the operating member for storing and releasing energy to the operating member to thereby reduce the input torque requirement of the drive means, may represent a hazard to the operator if energy is stored in the torsion spring means, unknown to the operator, when the apparatus is shut down, and in accordance with the invention hazard warning means provide an alarm when the drive means is shut off while energy is still stored in the torsion spring means. The hazard warning means is disabled while the drive means is operating.

In a preferred embodiment for reciprocating the sickle of an agricultural combine, the drive means comprises a wobble drive mechanism including a rotating power input member coupled to a crankshaft with a canted portion for converting rotary motion to oscillating motion for reciprocating the sickle. The rotatable power input member carries a position indicator element and is disposed in a predetermined position when the sickle is at the midpoint of its stroke with zero energy stored in the torsion spring means. The hazard warning means includes means for sensing the proximity of the position indicator element. The position indicator element is disposed adjacent the proximity sensing means when the power input member is at its predetermined position and the proximity sensing means generates an electrical signal in response to the position indicator element being spaced therefrom when the power input member is disposed away from its predetermined position. Preferably the position indicator element comprises an electrically conductive member and the proximity sensing means comprises a Hall effect device. The Hall device provides an output signal when the power input member is positioned away from the predetermined position (and thus the position indicator element is spaced from the Hall device) when the combine is shut down, and the hazard warning means also includes means responsive to the Hall device output signal to operate an audible or visible alarm device. The Hall effect device may include a transistor which is turned on and off, respectively, when the position indicator element is disposed adjacent to and spaced from the Hall device, and the hazard warning means may include a timing capacitor; means for charging the timing capacitor through a first timing resistance when the position indicator element is spaced from the Hall device and the transistor is turned off and for discharging the capacitor through a second timing resistance when the position indicator element is adjacent the Hall device and the transistor is turned on; a comparator operational amplifier having one input connected to a predetermined voltage and the voltage across the timing capacitor applied to its other input; and an alarm device connected to the output of the comparator operational amplifier which is operated when the position indicator member is positioned away from the Hall device so the capacitor is charged to a voltage greater than said predetermined voltage to thereby switch the output of the comparator operational amplifier high. The timing capacitor is alternately charged and discharged when the power input member is rotating, and the first and second timing resistances are selected so the voltage on the timing capacitor does not exceed said predetermined voltage during rotation of the power input member.

BRIEF DESCRIPTION OF THE DRAWINGS

The above and other objects and advantages of the invention will become more apparent from the following detailed description of a preferred embodiment when considered along with the accompanying drawing wherein:

FIG. 1 is a partial side view of an agricultural combine embodying the invention;

FIG. 4 is a schematic electrical circuit diagram of the means for providing a warning that energy is stored in the torsion spring when the combine is shut down.

DETAILED DESCRIPTION OF THE PREFERRED EMBODIMENT

Figure 3:
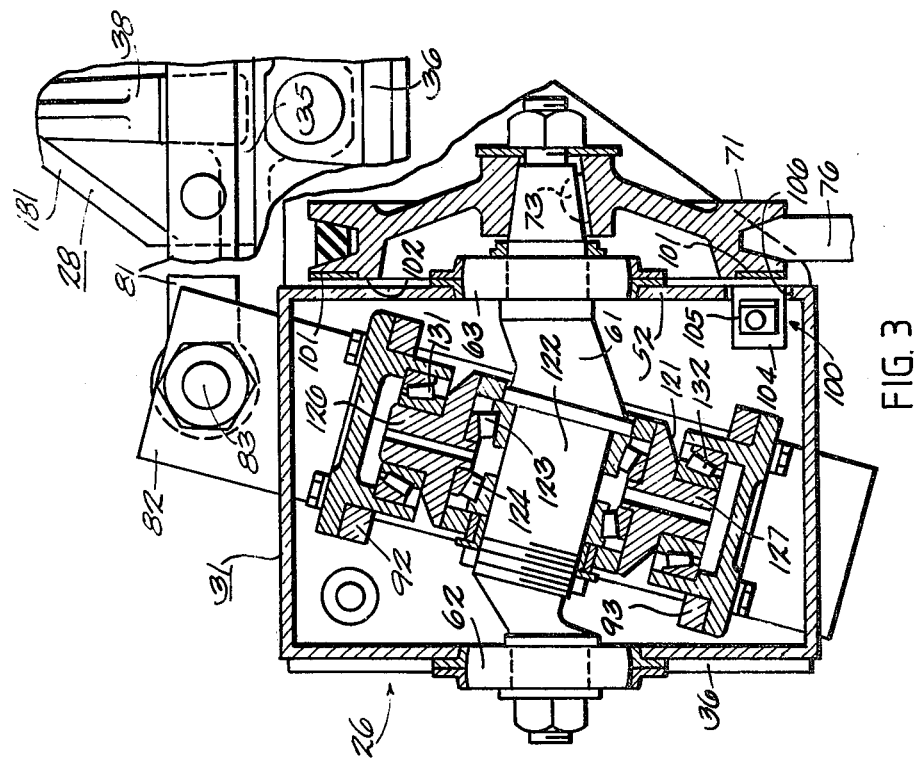
FIG. 3 is a view taken along line III—III in FIG. 1 and rotated clockwise 90°.

Referring to FIG. 1, an agricultural combine 11, in which the invention is incorporated, includes a pair of front drive wheels 12, 13, an operator's cab 14 and a header 16 pivotally connected to the main frame of the combine on a transverse pivot axis 17 for vertical swinging movement in response to expansion and contraction of a hydraulic jack 18 pivotally connected by a transverse pivot pin 19 to the bottom part of the header 16. The header 16 includes a transverse auger 21 which moves the material cut by a crop cutting mechanism 22 laterally toward the central part of the header where it is conveyed upwardly and rearwardly through a feeder portion 23 of the header to the threshing section of the combine. The crop cutting mechanism 22 includes a wobble drive mechanism 26 and a torsion bar device 27 which are interconnected to one another and to the horizontally reciprocating sickle 28 of the cutting mechanism 22 to provide a frequency of operation in the neighborhood of the resonant frequency. As shown in FIG. 3, the sickle 28 includes a sickle bar 81 and knife elements 181.

WOBBLE DRIVE AND TORSION BAR MECHANISM

The wobble drive mechanism 26 and torsion bar device 27 shown in the drawings are disclosed in aforementioned U.S. Pat. Nos. 4,342,186 and 4,342,187 having the same assignee as this invention. A wobble drive housing 31 is bolted at its lower end to a stationary frame member 36 to which the stationary cutter bar 35 of the crop cutting mechanism 22 is affixed. Housing 31 has a top wall portion 53 which supports and is bolted to a torsion bar mounting tube 56.

Figure 2:
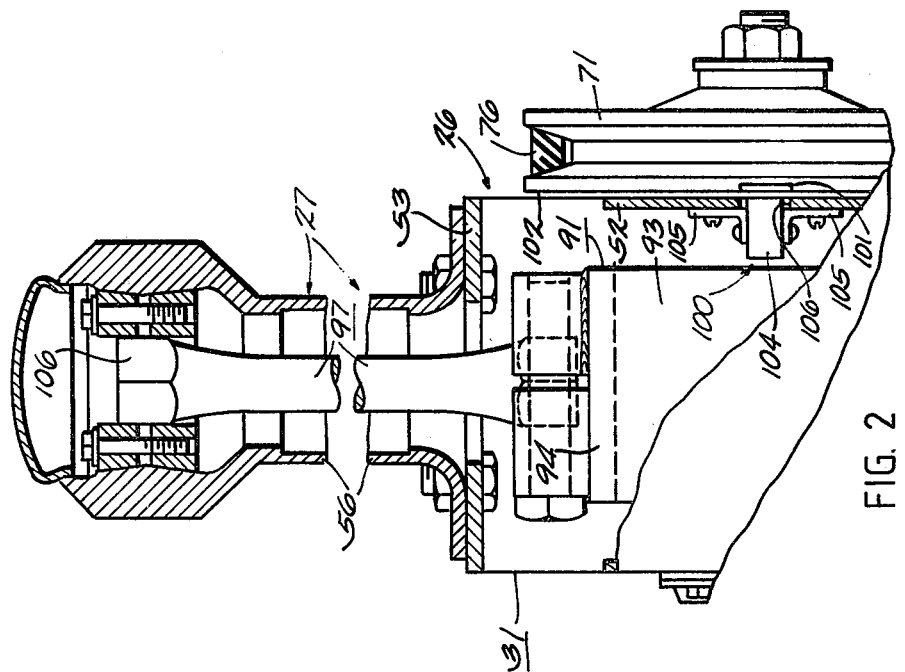
FIG. 2 is a partial rear view of the wobble drive and torsion bar mechanisms for the sickle cutting mechanism with parts broken away for illustration purposes.

A crankshaft 61 has its opposite ends mounted in bearings 62 and 63 secured to sidewalls of wobble drive housing 31 for rotation by a rotatable power input member such as a V-belt pulley 71 connected thereto by a key 73. An endless V-belt 76 engages pulley 71 and is driven by the combine engine (not shown). The reciprocating sickle 28 is pivotally connected by a bolt 83 to an oscillating horizontally extending drive lever 82 carrying a vertical pivot pin 86 which is journalled in a bearing 88 affixed to the lower wall of housing 31. An inverted U-shaped part 91 of lever 82 has downwardly extending vertical legs 92 and 93 welded to lever 82 at diametrically opposed sides of pivot pin 86. The horizontally disposed upper wall 94 (see FIG. 2) of U-shaped part 91 is rigidly secured to the lower end of a vertical torsion bar 97 of torsion device 27. The hex-shaped upper end 106 of torsion bar 97 is rigidly affixed to the upper end of torsion bar support tube 56 to secure the upper end of torsion bar 97 against rotary motion.

A trunnion ring 121 is journalled on a canted portion 122 of drive shaft 61 by a pair of antifriction bearings 123, 124. The trunnion portions 126, 127 of trunnion ring 121 are journalled in the vertical legs 92, 93 of U-shaped member 91 by bearings 131, 132. When the wobble drive shaft 61 is driven by belt 76, the trunnion ring 121 becomes an oscillating output member and causes lever 82 to oscillate and impart reciprocating motion to sickle bar 81.

Torsion bar 97 is in a neutral condition, that is, it is not subjected to a twisting force when the lever 82 is in a fore and aft position, which is the midpoint of the sickle stroke. However, when the operating lever 82 is rotated to the position shown in FIG. 3, the torsion bar 97 is rotated at its lower end (by virtue of its rigid connection to the lever 82) thereby storing energy in the torsion bar. The energy stored by the torsion bar 97 at the end of the stroke of the sickle bar 81 is released to the sickle bar 81 as the sickle bar begins a new stroke, thus contributing part of the force needed to cut the crop. By selecting a torsion bar with an appropriate spring rate, the resonant frequency of the sickle and its drive will fall within the reciprocating frequency range in which the sickle normally operates during various crop cutting operations. By storing the energy associated with movement of the reciprocating sickle (and oscillation of the lever and the trunnion ring) to the end of its stroke and releasing the energy as the sickle moves from the end of the stroke to the center of the stroke, the input drive torque needed to reciprocate the sickle 28 is substantially reduced.

HAZARD WARNING

Crop cutting mechanism 22, or wobble drive mechanism 26, can injure the combine operator if he tries to sevice it when the combine has been shut down with energy stored in torsion bar 97. This dangerous situation might be caused by a rock caught between a sickle knife element 181 and a guard 38 which will hold the sickle bar 81 near the end of its stroke with energy stored in torsion bar 97. Or inertia of the entire drive and cutting system may cause sickle bar 81 to stop at the end of its stroke with maximum energy stored in torsion bar 97. This danger is not obvious to the combine operator because torsion bar 97 cannot be seen, and the typical farmer is not familiar with energy storage drive systems for farm implements.

In accordance with the invention, the neutral position of torsion bar 97, which is the midpoint of the sickle bar stroke, is detected by proximity sensing means 100 including a pair of position indicator elements 101 affixed at diametrically opposed positions to the inner surface 102 of pulley 71. Preferably position indicator elements 101 comprise electrically conductive members which may be ferromagnetic and proximity sensing means 100 includes a stationary Hall effect device 104 mounted by L-shaped brackets 105 on wall 52 of wobble drive housing 31 and protruding through an opening 106 in wall 52 of housing 31 so that Hall device 104 is adjacent the inner surface 102 of pulley 71.

As schematically shown in FIG. 4, a DC power supply +V is connected across Hall effect device 104 which may be of the P/N 101XK11-1 type commercially available from Micro Switch Division of Honeywell, Inc. and includes a semiconductor chip 105 connected to the base of a transistor Q1 whose emitter is grounded so that Q1 is turned on when a ferromagnetic element 101 is adjacent Hall device 104 and changes the magnetic field influencing semiconductor chip 105 so the voltage across chip 105 is increased. Transistor Q1 is turned off when both ferromagnetic position indicator elements 101 are spaced from Hall device 104.

When torsion bar 97 is at its neutral position at the midpoint of the sickle bar stroke, pulley 71 is at a predetermined position wherein one of the ferromagnetic elements 101 is opposite Hall device 104. Wobble drive shaft 61 makes on-half revolution from such neutral position in actuating sickle cutter bar 81 to one end of its stroke and returning it to the midpoint where the other ferromagnetic element 101 is opposite Hall device 104, and shaft 61 then rotates through another one-half revolution to actuate sickle cutter bar 81 to the opposite end of its stroke and returning it to the neutral position at the midpoint of the stroke wherein pulley 71 is again in its predetermined position with a ferromagnetic element 101 opposite Hall device 104 and minimum energy stored in torsion bar 97. Transistor Q1 is thus turned on when cutter bar 81 is at the midpoint of its stroke and torsion bar 97 is at neutral position and Q1 is turned off when neither ferromagnetic element 101 is opposite Hall device 104 and pulley 71 is away from its predetermined position.

The anode of a light (preferably yellow) emitting diode LED 1 is connected to power supply +V, and the cathode of LED 1 is connected through a resistance R3 to the collector of transistor Q1 so that LED 1 is turned on when ferromagnetic element 101 is opposite Hall device 104 and Q1 is turned on and completes a circuit through its collector-emitter circuit to ground, and LED 1 is turned off when Q1 is off. Light emitting diode LED 1 blinks at the rate of rotation of shaft 61 to indicate that the hazard warning system is operative.

One terminal of a timing capacitor C1 is grounded and its opposite terminal is connected through a first timing resistance R2 to power supply +V so that capacitor C1 is charged when Q1 is turned off to a voltage $V_c$ at a rate whose RC time constant is R2, C1. The junction between C1 and R2 is connected through a second timing resistance R1 to the anode of a diode D1 whose cathode is connected to the collector of transistor Q1 so that timing capacitor C1 is discharged through the series arrangement of R1, D1 and the collector-emitter circuit of Q1 when Q1 is turned on. C1 is discharged at a rate determined by the RC time constant R1, C1. When Q1 is turned off, timing capacitor C1 is charged from power supply +V through first timing resistance R2. Consequently capacitor C1 is charged and discharged intermittently as shaft 61 rotates and moves ferromagnetic elements 101 past Hall device 104.

The junction between R2 and C1 is also connected to the (+) input of a operational amplifier comparator OPAMP. A voltage divider comprised of two resistances R4 and R5 connected in series between the power supply +V and ground develops a voltage $V_{REF}$ at the junction of R4 and R5 which is coupled to the (−) input of comparator OPAMP. An alarm device ALARM is connected between the output of comparator OPAMP and ground, and a (preferably red) light emitting diode LED 2 is connected in series with a resistance R7 between the output of OPAMP and ground. When neither ferromagnetic position indicator element 101 is opposite Hall device 104, transistor Q1 is off and capacitor C1 charges through R2 to a voltage $V_c$ which is higher than the voltage $V_{REF}$ on the (−) input of comparator OPAMP, thereby changing the output of OPAMP to high to operate the ALARM device and light red LED 2 as a warning to the combine operator that energy is still stored in torsion bar 97 even though the combine is shut off.

Anytime a ferromagnetic element 101 is opposite Hall device 104 (either stationary or rapidly rotating), transistor Q1 is turned on and discharges C1 through R1, D1 and the collector-emitter path of Q1. The voltage $V_c$ applied to the (+) input of comparator OPAMP then falls below the voltage $V_{REF}$ applied to its (−) input, and the output of OPAMP falls low to turn off the ALARM device and red LED 2 and thus disable the hazard warning means. A resistance R6 is connected between the (+) input of OPAMP and its output provides hysteresis around the comparator switch point to avoid false alarms.

The torsion spring coupled wobble drive is capable of three different states: (1) stopped with no energy stored in torsion bar 97 and a ferromagnetic element opposite Hall device 104; (2) stopped with energy still stored in torsion bar 97 and both ferromagnetic elements spaced from Hall device 104; and (3) rotating with ferromagnetic elements 101 periodically passing Hall device 104. The duration that transistor Q1 is on when a rotating ferromagnetic element 101 is opposite Hall device 104 and the RC time constants R1, C1 and R2, C1 are selected so that voltage $V_c$ across capacitor C1 does not exceed $V_{REF}$ (applied to the (−) input of comparator OPAMP) when C1 is charged through R2 for the time that Q1 is off during rotation of power input pulley 71 (when both ferromagnetic elements 101 are periodically spaced from Hall device 104), thereby disabling the hazard warning means when the combine is operating. The charging of C1 through R2 and discharging through R1 continuously repeats as shaft 61 rotates. However, since $V_c$ remain less than $V_{REF}$, the ALARM and red light remain off when the torsion spring coupled wobble drive system 26, 27 is in operation, and the ALARM and red light LED are only operated when wobble drive mechanism 26 is stopped with energy still stored in torsion bar 97 and pulley 71 is spaced from its predetermined position so both ferromagnetic elements 101 are spaced from Hall device 104.

In an alternative embodiment each position indicator element 101 is an adhesive-backed, non-ferrous, electrically conductive foil affixed to pulley 71. In another embodiment the position indicator elements 101 comprise magnets affixed to pulley 71 and proximity sensing means 100 includes a ferromagnetic reed switch. It will be appreciated that the proximity sensing means can also be of the optical type which may include a photodiode for emitting a radiant energy beam and a photoelectric diode for detecting such beam.

The embodiments of the invention in which an exclusive property or privilege is claimed are defined as follows:

1. An apparatus having a reciprocable operating member,
   drive means for reciprocating said operating member,
   torsion spring means operatively connected to said drive means and to said operating member end having a neutral position with minimum energy stored therein when said operating member is at the midpoint of its reciprocation and being loaded to store energy therein when said operating member is actuated in either direction away from said midpoint, and
   means for providing an alarm when said drive means is shut off while energy is still stored in said torsion spring means.

2. In the combination of claim 1 wherein said drive means has a rotatable power input member and comprises means for converting rotary motion of said power input member to oscillatory motion for reciprocating said operating member and which power input member is at a predetermined position when said operating member is at said midpoint of its reciprocation, and wherein said alarm providing means includes a position indicator element affixed to said rotating power input member and means for sensing the proximity of said position indicator element, said position indicator element being disposed adjacent said proximity sensing means when said power input member is at said predetermined position, said proximity sensing means generating an electrical signal in response to said position indicator element being spaced therefrom when said rotary drive member is positioned away from said predetermined position.

3. In the combination of claim 2 wherein said proximity sensing means comprises a Hall effect device and said position indicator element comprises an electrically conductive member.

4. In the combination of claim 3 wherein said alarm providing means is disabled while said drive means is operating.

5. In the combination of claim 4 wherein said Hall effect device includes a transistor which is turned on and off when said position indicator member is disposed respectively adjacent and away from said Hall effect device, and said alarm providing means also includes a timing capacitor and means for charging said timing capacitor through a first timing resistance when said transistor is turned off and for discharging said timing capacitor through a second timing resistance when said transistor is turned on.

6. In the combination of claim 5 wherein said alarm providing means also includes a comparator operational amplifier having one input connected to a predetermined voltage and the voltage across said timing capacitor applied to its other input and an alarm device connected to its output so that said alarm device is operated when the voltage across said timing capacitor exceeds said predetermined voltage.

7. In the combination of claim 6 wherein the RC time constants of said timing capacitor with said first and second timing resistances respectively are selected so that the voltage across said timing capacitor as a result of charging thereof when said transistor is turned off and discharging thereof when said transistor is turned on does not exceed said predetermined voltage during rotation of said power input member to reciprocate said operating member, thereby disabling said alarm providing means when said drive means is operating.

8. In the combination of claim 7 wherein said means for converting rotary motion of said power input member to oscillating motion includes a lever operatively connected to said reciprocable operating member and pivotally supported about an oscillation axis generally transverse to the direction of reciprocation thereof and said torsion spring means includes an elongated torsion bar in alignment with said oscillation axis and being rigidly secured at one end to said lever and means nonrotatably supporting the other end of said torsion bar so it stores energy as the operating member is moved from said midpoint of its reciprocation to the end thereof and releases stored energy as the operating member returns to said midpoint.

9. In the combination of claim 8 wherein said drive means for reciprocating said operating member includes a wobble drive mechanism having a rotatable crankshaft with a canted portion and said power input member is affixed to said crankshaft.

10. In the combination of any one of claims 1 through 9 wherein said apparatus is an agricultural combine and said operating member is a reciprocable sickle.

11. In an agricultural combine having a reciprocable sickle,
    drive means including a rotatable power input member for converting rotary motion into oscillating motion to reciprocate said sickle,
    torsion spring means operatively coupled to said drive means and to said sickle and having a neutral position with minimum energy stored therein when said sickle is at the midpoint of its reciprocation and being loaded to store energy when said sickle is actuated in either direction away from said midpoint and to release said stored energy when said sickle is returned toward said midpoint to thereby reduce the input torque requirement of said drive means, and
    hazard warning means for providing an alarm when said drive means is shut off while energy is still stored in said torsion spring means, said hazard warning means being disabled while said drive means is operating.

12. In an agricultural combine in accordance with claim 11 wherein said power input member is at a predetermined position when said sickle is at said midpoint of its reciprocation and said hazard warning means includes a stationary Hall effect device and an electrically conductive position indicator element affixed to said rotatable power input member and disposed adjacent said Hall effect device when said power input member is at said predetermined position.

13. In an agricultural combine in accordance with claim 12 wherein said hazard warning means also includes a transistor which is turned on and off respectively when said position indicator element is disposed adjacent to and is spaced away from said Hall effect device, a timing capacitor, and means for charging said timing capacitor through a first timing resistance when said transistor is turned off and for discharging said timing capacitor through a second timing resistance when said transistor is turned on.

14. In an agricultural combine in accordance with claim 13 wherein said means for converting rotary motion into oscillating motion includes a wobble drive mechanism provided with a crankshaft having a canted portion and being affixed to said rotatable power input member.

15. In an agricultural combine in accordance with claim 14 wherein said means for converting rotary motion into oscillatory motion of said sickle also includes a lever operatively connected to said sickle and pivotally supported about an oscillation axis generally transverse to the direction of reciprocation thereof and said torsion spring means includes an elongated torsion bar in alignment with said oscillation axis and being rigidly secured at one end to said lever and means nonrotatably supporting the other end of said torsion bar so it stores energy as the sickle is reciprocated from said midpoint to the end of its stroke and releases stored energy as said sickle returns to said midpoint.

16. In an agricultural combine in accordance with claim 13 wherein said hazard warning means also includes a comparator operational amplifier having the voltage across said timing capacitor applied to one input and a predetermined voltage applied to its other input and an alarm device coupled to its output so said alarm is operated when said timing capacitor is charged to a potential higher than said predetermined voltage.

17. In an agricultural combine in accordance with claim 16 wherein the RC time constants of said timing capacitor with said first and second timing resistances respectively are selected so that the voltage across said timing capacitor is a result of charging when said transistor is turned off and discharging when said transistor is turned on does not exceed said predetermined voltage during rotation of said power input member, thereby disabling said hazard warning means when said drive means is operating.

* * * * *